United States Patent
Tsai et al.

(10) Patent No.: US 6,524,167 B1
(45) Date of Patent: Feb. 25, 2003

(54) METHOD AND COMPOSITION FOR THE SELECTIVE REMOVAL OF RESIDUAL MATERIALS AND BARRIER MATERIALS DURING SUBSTRATE PLANARIZATION

(75) Inventors: Stan Tsai, Fremont, CA (US); Lizhong Sun, San Jose, CA (US); Shijian Li, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/698,863

(22) Filed: Oct. 27, 2000

(51) Int. Cl.⁷ .................................................. B24B 1/00
(52) U.S. Cl. ......................... 451/41; 451/36; 438/692
(58) Field of Search .......................... 451/36, 37, 41; 216/88, 89, 90; 438/690–693

(56) References Cited

U.S. PATENT DOCUMENTS

| 4,169,337 A | 10/1979 | Payne | 51/283 R |
| 4,588,421 A | 5/1986 | Payne | 51/308 |

(List continued on next page.)

FOREIGN PATENT DOCUMENTS

| EP | 0659858 | 6/1995 | C09G/1/02 |
| EP | 0896042 | 2/1999 | C09G/1/02 |

(List continued on next page.)

OTHER PUBLICATIONS

US 5,985,755, 11/1999, Bajaj et al. (withdrawn)
U.S. patent application Ser. No. 09/247,381, Cheung et al., filed Feb. 10, 1999.
U.S. patent application Ser. No. 09/401,643, Li et al., filed Sep. 22, 1999.

(List continued on next page.)

Primary Examiner—Joseph J. Hail, III
Assistant Examiner—David B. Thomas
(74) Attorney, Agent, or Firm—Moser, Patterson and Sheridan

(57) ABSTRACT

A method and composition for selective removal of a conductive material residue and a portion of the barrier layer from a substrate surface. The composition includes a chelating agent, an oxidizer, a corrosion inhibitor, abrasive particles, and water. The composition may further include one or more pH adjusting agents and/or one or more pH buffering agents. The method comprises selective removal of conductive material residue and a portion of the barrier layer from a substrate surface by applying a composition to a polishing pad, the composition including a chelating agent, an oxidizer, a corrosion inhibitor, abrasive particles, and water. The composition may further include one or more pH adjusting agents and/or one or more pH buffering agents. In one aspect, the method comprises providing a substrate comprising a dielectric layer with feature definitions formed therein, a barrier layer conformally deposited on the dielectric layer and in the feature definitions formed therein, and a copper containing material deposited on the barrier layer and filling the feature definitions formed therein, polishing the substrate to substantially remove the conductive material, and polishing the substrate with a composition comprising a chelating agent, an oxidizer, a corrosion inhibitor, abrasive particles, and water to remove conductive material residue and a portion of the barrier layer.

56 Claims, 2 Drawing Sheets

U.S. PATENT DOCUMENTS

| | | | | |
|---|---|---|---|---|
| 4,752,628 A | 6/1988 | Payne | ............ | 523/122 |
| 4,867,757 A | 9/1989 | Payne | ............ | 51/293 |
| 4,920,031 A | 4/1990 | Ohno et al. | ............ | 430/522 |
| 5,264,010 A | 11/1993 | Brancaleoni et al. | ............ | 51/308 |
| 5,340,370 A | 8/1994 | Cadien et al. | ............ | 51/308 |
| 5,614,444 A | 3/1997 | Farkas et al. | ............ | 437/225 |
| 5,676,587 A | 10/1997 | Landers et al. | ............ | 451/57 |
| 5,693,563 A | 12/1997 | Teong | ............ | 437/190 |
| 5,700,383 A | 12/1997 | Feller et al. | ............ | 216/88 |
| 5,735,963 A | 4/1998 | Obeng | ............ | 134/3 |
| 5,738,574 A | 4/1998 | Tolles et al. | ............ | 451/288 |
| 5,738,800 A | 4/1998 | Hosali et al. | ............ | 216/99 |
| 5,756,398 A | 5/1998 | Wang et al. | ............ | 438/692 |
| 5,769,689 A | 6/1998 | Cossaboon et al. | ............ | 451/41 |
| 5,770,095 A | 6/1998 | Sasaki et al. | ............ | 216/38 |
| 5,783,489 A | 7/1998 | Kaufman et al. | ............ | 438/692 |
| 5,840,629 A | 11/1998 | Carpio | ............ | 438/692 |
| 5,842,910 A | 12/1998 | Krywanczyk et al. | ............ | 451/41 |
| 5,866,031 A | 2/1999 | Carpio et al. | ............ | 252/79.1 |
| 5,876,508 A | 3/1999 | Wu et al. | ............ | 134/2 |
| 5,893,796 A | 4/1999 | Birang et al. | ............ | 451/526 |
| 5,911,835 A | 6/1999 | Lee et al. | ............ | 134/1.3 |
| 5,932,486 A | 8/1999 | Cook et al. | ............ | 438/692 |
| 5,954,997 A | 9/1999 | Kaufman et al. | ............ | 252/79.1 |
| 5,958,794 A | 9/1999 | Bruxvoort et al. | ............ | 438/692 |
| 5,981,454 A | 11/1999 | Small | ............ | 510/175 |
| 5,985,748 A | 11/1999 | Watts et al. | ............ | 438/622 |
| 6,001,730 A | 12/1999 | Farkas et al. | ............ | 438/627 |
| 6,033,993 A | 3/2000 | Love, Jr. et al. | ............ | 438/745 |
| 6,042,741 A | 3/2000 | Hosali et al. | ............ | 252/79.1 |
| 6,046,110 A | 4/2000 | Hirabayashi et al. | ............ | 438/693 |
| 6,054,379 A | 4/2000 | Yau et al. | ............ | 438/623 |
| 6,068,879 A | 5/2000 | Pasch | ............ | 427/97 |
| 6,074,949 A | 6/2000 | Schonauer et al. | ............ | 438/692 |
| 6,077,337 A | 6/2000 | Lee | ............ | 106/3 |
| 6,083,840 A | 7/2000 | Mravic et al. | ............ | 438/693 |
| 6,117,775 A | 9/2000 | Kondo et al. | ............ | 438/690 |
| 6,117,783 A | 9/2000 | Small et al. | ............ | 438/693 |
| 6,136,714 A | 10/2000 | Schutz | ............ | 438/692 |
| 6,143,656 A | 11/2000 | Yang et al. | ............ | 438/687 |
| 6,156,661 A | 12/2000 | Small | ............ | 438/692 |
| 6,183,656 B1 * | 2/2001 | Ide et al. | ............ | 216/85 |
| 6,183,686 B1 | 2/2001 | Bardus et al. | ............ | 419/8 |
| 6,194,317 B1 | 2/2001 | Kaisaki et al. | ............ | 438/692 |
| 6,210,525 B1 | 4/2001 | James et al. | ............ | 156/345 |
| 6,218,290 B1 | 4/2001 | Schonauer et al. | ............ | 438/633 |
| 6,238,592 B1 | 5/2001 | Hardy et al. | ............ | 252/79.1 |
| 6,245,679 B1 | 6/2001 | Cook et al. | ............ | 438/692 |
| 6,258,721 B1 * | 7/2001 | Li et al. | ............ | 106/3 |
| 6,096,652 A1 | 8/2001 | Watts et al. | ............ | 438/692 |
| 6,270,393 B1 | 8/2001 | Kubota et al. | ............ | 451/36 |
| 6,271,416 B1 | 8/2001 | Takagaki et al. | ............ | 562/433 |
| 6,348,076 B1 | 2/2002 | Canapen et al. | ............ | 51/309 |
| 6,348,725 B2 | 2/2002 | Cheung et al. | ............ | 257/642 |
| 6,375,559 B1 * | 4/2002 | James et al. | ............ | 451/527 |
| 6,409,781 B1 | 6/2002 | Wojtczak et al. | ............ | 51/308 |
| 6,417,087 B1 | 7/2002 | Chittipeddi et al. | ............ | 438/612 |

FOREIGN PATENT DOCUMENTS

| | | | | |
|---|---|---|---|---|
| EP | 0 913 442 A2 | 5/1999 | ............ | C09G/1/02 |
| EP | 0846742 | 6/1999 | ............ | C09G/1/02 |
| EP | 1 006 166 A1 | 6/2000 | ............ | C09G/1/02 |
| EP | 1 011 131 | 6/2000 | ............ | H01L/21/321 |
| EP | 1 085 067 | 3/2001 | ............ | C09G/1/02 |
| WO | WO 98/04646 | 2/1998 | ............ | C09K/13/00 |
| WO | WO 98/36045 | 8/1998 | ............ | C11D/3/18 |
| WO | 98/41671 | 9/1998 | ............ | C23F/1/14 |
| WO | WO 98/49723 | 11/1998 | ............ | H01L/21/321 |
| WO | WO00/00561 | 1/2000 | ............ | C09G/1/02 |
| WO | WO 00/24842 | 5/2000 | ............ | C09K/3/14 |
| WO | WO 00/30159 | 5/2000 | ............ | H01L/21/00 |
| WO | WO 00/36037 | 6/2000 | ............ | C09G/1/02 |
| WO | WO 00/49647 | 8/2000 | ............ | H01L/21/302 |
| WO | WO 00/53691 | 9/2000 | ............ | C09K/3/14 |
| WO | WO01/12739 | 2/2001 | ............ | C09G/1/02 |

OTHER PUBLICATIONS

U.S. patent application Ser. No. 09/469,708, Li et al., filed Dec. 21, 1999.
U.S. patent application Ser. No. 09/543,777, Sun et al., filed Apr. 5, 2000.
U.S. patent application Ser. No. 09/544,281, Sun et al., filed Apr. 6, 2000.
U.S. patent application Ser. No. 09/606,544, Sun et al., filed Jun. 30, 2000.
U.S. patent application Ser. No. 09/608,078, Sun et al., filed Jun. 20, 2000.
U.S. patent application Ser. No. 09/694,866, Wang et al., filed Oct. 23, 2000.
U.S. patent application Ser. No. 09/698,863, Tsai et al., filed Oct. 27, 2000.
U.S. patent application Ser. No. 09/698,864, Li et al., filed Oct. 27, 2000.
U.S. patent application Ser. No. 09/569,986, Sun et al., filed Nov. 12, 2000.
U.S. patent application Ser. No. 09/741,538, Li et al., filed Dec. 20, 2000.
International Search Report for PCT/US02/00062, dated Jul. 8, 2002.
USSN 09/569,968 filed May 11, 2000 (Sun, et al); "Selective Removal of Tantalum–Containing Barrier Layer During Metal CMP".
USSN 09/755,717 filed Jan. 5, 2001 (Sun, et al); "Tantalum Removal During Chemical Mechanical Polishing".
USSN 10/187,857 filed Jun. 27, 2002 (Tsai, et al.); "Barrier Removal at Low Polish Pressure".
USSN 10/193,810 filed Jul. 11, 2002 (Tsai, et al.); "Dual Reduced Agents for Barrier Removal in Chemical Mechanical Polishing".
USSN 10/215,521 filed Oct. 8, 2002 (Sun, et al.); "Selective Removal of Tantalum–Containing Barrier Layer During Mental CMP Title".
USSN 09/698,864 filed Oct. 27, 2000 (Sun, et al.) Method and Apparatus for Two–Step Barrier Layer Polishing.
U.S. Patent Publication No. US 2001/0036798, published Nov. 1, 2001, "Methods for Chemical–Mechanical Polishing of Semiconductor Wafers," USSN 09/833,309.
Brusic, V., et al., "Copper Corrosion with and Without Inhibitors," *Electrochem. Soc.*, 138:8, 2253–2259, Aug. 1991.
PCT International Search Report from International Application No. PCT/US01/50150, Dated Sep. 23, 2002.

* cited by examiner

METHOD AND COMPOSITION FOR THE SELECTIVE REMOVAL OF RESIDUAL MATERIALS AND BARRIER MATERIALS DURING SUBSTRATE PLANARIZATION

BACKGROUND OF THE INVENTION

1. Field of the Invention

The present invention relates generally to the fabrication of semiconductor devices and to chemical mechanical polishing and planarization of semiconductor devices.

2. Background of the Related Art

In the fabrication of integrated circuits and other electronic devices, multiple layers of conducting, semiconducting, and dielectric materials are deposited on or removed from a surface of a substrate. Thin layers of conducting, semiconducting, and dielectric materials may be deposited by a number of deposition techniques. Common deposition techniques in modern processing include physical vapor deposition (PVD), also known as sputtering, chemical vapor deposition (CVD), plasma-enhanced chemical vapor deposition (PECVD), and now electrochemical plating (ECP).

As layers of materials are sequentially deposited and removed, the uppermost surface of the substrate may become non-planar across its surface and require planarization. Planarizing a surface, or "polishing" a surface, is a process where material is removed from the surface of the substrate to form a generally even, planar surface. Planarization is useful in removing undesired surface topography and surface defects, such as rough surfaces, agglomerated materials, crystal lattice damage, scratches, and contaminated layers or materials. Planarization is also useful in forming features on a substrate by removing excess deposited material used to fill the features and to provide an even surface for subsequent levels of metallization and processing.

Chemical mechanical planarization, or chemical mechanical polishing (CMP), is a common technique used to planarize substrates. CMP utilizes a chemical composition, typically a slurry or other fluid medium, for selective or non-selective removal of material from substrates. In conventional CMP techniques, a substrate carrier or polishing head is mounted on a carrier assembly and positioned in contact with a polishing pad in a CMP apparatus. The carrier assembly provides a controllable pressure to the substrate urging the substrate against the polishing pad. The pad is moved relative to the substrate by an external driving force. Thus, the CMP apparatus effects polishing or rubbing movement between the surface of the substrate and the polishing pad while dispersing a polishing composition, or slurry, to effect both chemical activity and mechanical activity.

Conventional CMP processes are performed using an abrasive article, such as a polishing composition, or slurry, containing abrasive particles in a reactive solution with a conventional polishing pad. Alternatively, the abrasive article can be a fixed abrasive article, such as a fixed abrasive polishing pad, which may be used with a CMP composition or slurry that does not contain abrasive particles. A fixed abrasive article typically comprises a backing sheet with a plurality of geometric abrasive composite elements adhered thereto.

Conventionally, in polishing substrates having features, such as a dual damascenes features formed by the deposition of a barrier layer in an aperture and a conductive material, for example copper, disposed on the barrier layer formed thereon, the conductive material is polished to the barrier layer, and then the barrier layer is polished to the underlying dielectric layer to form the feature. One challenge which is presented in polishing conductive materials is that the interface between the conductive material and the barrier layer is generally non-planar. Further, the conductive material and the barrier materials are often removed from the substrate surface at different rates, both of which can result in excess conductive material being retained on the substrate surface.

To ensure removal of all the conductive material before removing the barrier material, the conductive material may be overpolished, which often results in dishing of the conductive material in the features formed on the substrate. Dishing occurs when a portion of the surface of a metal deposited in an aperture or other substrate structure formed in a dielectric layer is excessively polished resulting in one or more concavities or depressions. Dishing performance is used to describe the ability of a CMP composition or process to polish and planarize a surface without dishing or with reduced dishing of the surface. Overpolishing or dishing of the conductive materials can result in forming topographical defects, such as concavities or depressions, and can further lead to non-uniform removal of the barrier layer disposed thereunder.

One solution to dishing is the addition of corrosion inhibitors to the CMP composition to reduce dishing, improve dishing performance, and prevent corrosion of materials during the CMP process. The corrosion inhibitors prevent or reduce the oxidation and corrosion of the metal surfaces, and allow for a more planar surface. However, CMP compositions containing corrosion inhibitors have been observed to have reduced metal dissolution during polishing and decreased solubility of polishing by-products, such as metal ions, in comparison to CMP compositions without corrosion inhibitors. The reduced metal dissolution and decreased by-product solubility in CMP compositions can result in deposition or re-deposition of metals and by-products on the substrate during the CMP process. Metals and by-products deposited during CMP processes have been observed to remain as undesirable metal residues after the CMP process which can detrimentally affect subsequent polishing processes and the polish quality of the substrate.

Therefore, there exists a need for a method and CMP composition that reduces the deposition or re-deposition of materials during CMP processing.

SUMMARY OF THE INVENTION

The invention generally provides a method and composition for planarizing a substrate surface by selective removal of a conductive material residue and a portion of the barrier layer from a substrate surface. In one aspect, the invention provides a composition adapted for selective removal of a conductive material residue and a barrier layer material in a polishing process, the composition including a chelating agent, an oxidizer, a corrosion inhibitor, abrasive particles, and water. The composition may further include one or more pH adjusting agents and/or one or more pH buffering agents.

In another aspect, the invention provides a method for selective removal of a conductive material residue and a portion of the barrier layer from a substrate surface, the method comprising applying a composition to a polishing pad, the composition comprising a chelating agent, an oxidizer, a corrosion inhibitor, abrasive particles, and water.

The composition may further include one or more pH adjusting agents and/or one or more pH buffering agents.

Another aspect of the invention provides a method for processing a substrate including providing a substrate comprising a dielectric layer with feature definitions formed therein, a barrier layer conformally deposited on the dielectric layer and in the feature definitions formed therein, and a copper containing material deposited on the barrier layer and filling the feature definitions formed therein, polishing the substrate to substantially remove the conductive material, and polishing the substrate with a composition comprising a chelating agent, an oxidizer, a corrosion inhibitor, abrasive particles, and water to remove conductive material residue and a portion of the barrier layer

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

CMP is broadly defined herein as polishing a substrate by chemical activity, mechanical activity, or a combination of both chemical and mechanical activity. In some systems, a substrate is polished on a pad in the presence of a polishing fluid, also known as a slurry, which may contain chemicals that pacify or oxidize the layer being polished and abrasives that abrasively remove or polish off the surface of the layer. The interaction of a polishing pad, the chemically reactive polishing fluid, and the abrasive polishing fluid with the surface of the substrate imparts a combination of chemical and mechanical forces to the substrate which planarizes the substrate surface and results in controlled polishing of the exposed layer. In a fixed-abrasive system, a polishing pad called a fixed abrasive pad is used which does not require abrasive particles within the slurry. Typically, a polishing fluid without abrasive particles is used in concert with the fixed abrasive pad to provide the chemical component of the polishing process.

The invention will be described below in reference to a planarizing process and compositions that can be carried out using chemical mechanical polishing process equipment, such as the Mirra® CMP System available from Applied Materials, Inc., as shown and described in U.S. Pat. No. 5,738,574, entitled, "Continuous Processing System for Chemical Mechanical Polishing," the entirety of which is incorporated herein by reference to the extent not inconsistent with the invention. Although, the CMP processes and compositions are illustrated utilizing the Mirra® CMP System, any system enabling polishing of substrates using the compositions and methods described herein can be used to advantage. The following apparatus description is illustrative and should not be construed or interpreted as limiting the scope of the invention.

Figure 1:
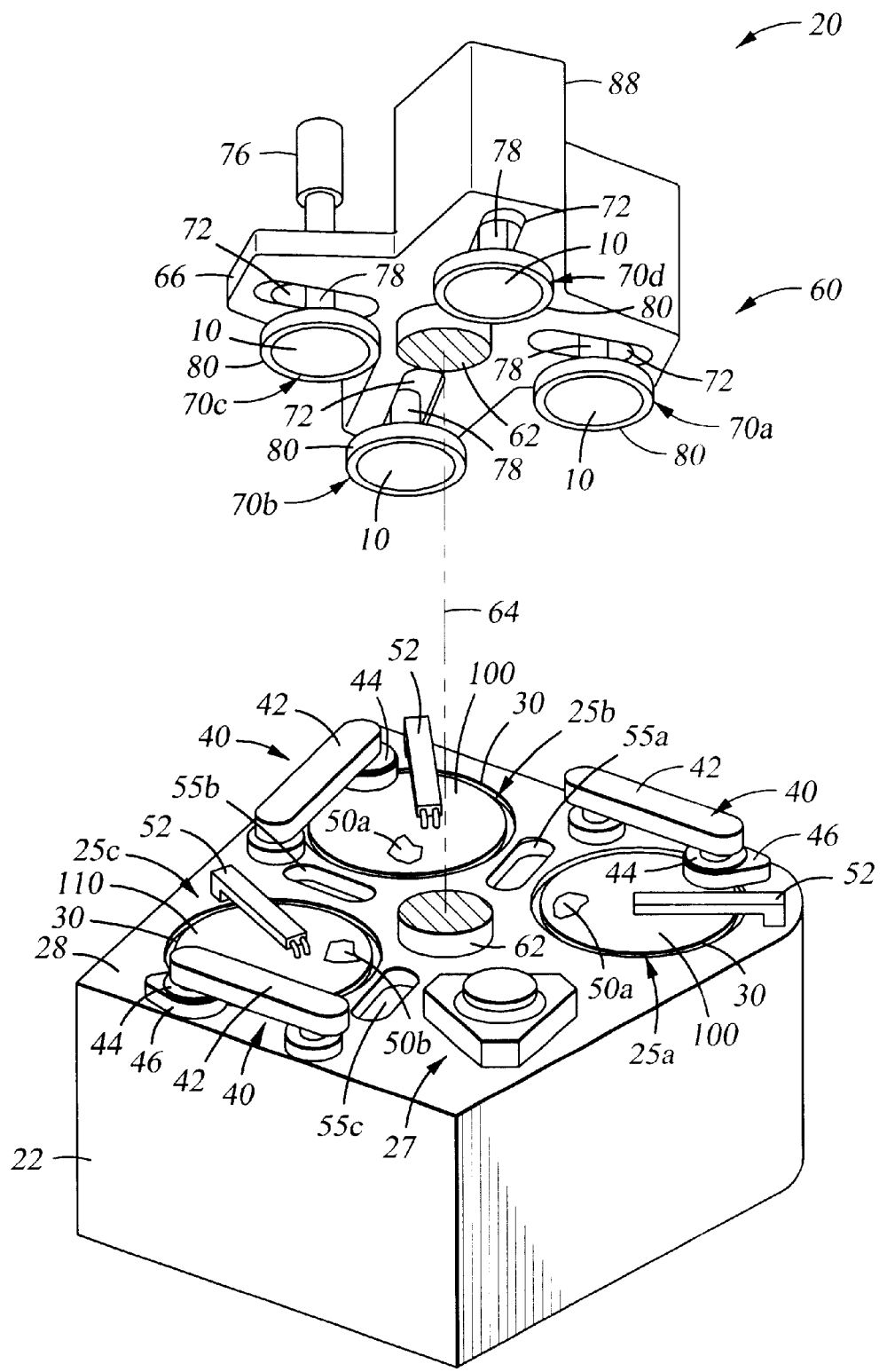
FIG. 1 is a schematic perspective view of a chemical mechanical polishing apparatus.

FIG. 1 is a schematic perspective view of a chemical mechanical polishing apparatus 20. The polishing apparatus 20 includes a lower machine base 22 with a table top 28 mounted thereon and a removable outer cover (not shown). The table top 28 supports a series of polishing stations, including a first polishing station 25a, a second polishing station 25b, a final polishing station 25c, and a transfer station 27. The transfer station 27 serves multiple functions, including, for example, receiving individual substrates 10 from a loading apparatus (not shown), washing the substrates, loading the substrates into carrier heads 80, receiving the substrates 10 from the carrier heads 80, washing the substrates 10 again, and transferring the substrates 10 back to the loading apparatus.

Each polishing station 25a–25c includes a rotatable platen 30 having a polishing pad 100 or 110 disposed thereon. Each platen 30 may be a rotatable aluminum or stainless steel plate connected to a platen drive motor (not shown). The polishing stations 25a–25c may include a pad conditioner apparatus 40. The pad conditioner apparatus 40 has a rotatable arm 42 holding an independently rotating conditioner head 44 and an associated washing basin 46. The pad conditioner apparatus 40 maintains the condition of the polishing pad so that it will effectively polish the substrates. Each polishing station may include a conditioning station if the CMP apparatus is used with other pad configurations.

The polishing stations 25a–25c may each have a slurry/rinse arm 52 that includes two or more supply tubes to provide one or more chemical slurries and/or water to the surface of the polishing pad. The slurry/rinse arm 52 delivers the one or more chemical slurries in amounts sufficient to cover and wet the entire polishing pad. Each slurry/rinse arm 52 also includes several spray nozzles (not shown) that can provide a high-pressure fluid rinse on to the polishing pad at the end of each polishing and conditioning cycle. Furthermore, two or more intermediate washing stations 55a, 55b, and 55c may be positioned between adjacent polishing stations 25a, 25b, and 25c to clean the substrate as it passes from one station to the next. While not shown, multiple supply tubes can be connected to the slurry/rinse arm for mixing at the slurry/rinse prior to delivery to the polishing pad. This allows in situ mixing of various compounds at the point of use.

A rotatable multi-head carousel 60 is positioned above the lower machine base 22. The carousel 60 includes four carrier head systems 70a, 70b, 70c, and 70d. Three of the carrier head systems receive or hold the substrates 10 by pressing them against the polishing pads 100 or 110 disposed on the polishing stations 25a–25c. One of the carrier head systems 70a–70d receives a substrate from and delivers a substrate 10 to the transfer station 27. The carousel 60 is supported by a center post 62 and is rotated about a carousel axis 64 by a motor assembly (not shown) located within the machine base 22. The center post 62 also supports a carousel support plate 66 and a cover 68.

The four carrier head systems 70a–70d are mounted on the carousel support plate 66 at equal angular intervals about the carousel axis 64. The center post 62 allows the carousel motor to rotate the carousel support plate 66 and orbit the carrier head systems 70a–70d about the carousel axis 64.

Each carrier head system 70a–70d includes one carrier head 80. A carrier drive shaft 78 connects a carrier head rotation motor 76 (shown by the removal of one quarter of the cover 68) to the carrier head 80 so that the carrier head 80 can independently rotate about its own axis. There is one carrier drive shaft 74 and motor 76 for each head 80. In addition, each carrier head 80 independently oscillates laterally in a radial slot 72 formed in the carousel support plate 66.

The carrier head 80 performs several mechanical functions. Generally, the carrier head 80 holds the substrate 10 against the polishing pad 100 or 110, evenly distributes a downward pressure across the back surface of the substrate 10, transfers torque from the drive shaft 78 to the substrate 10, and ensures that the substrate 10 does not slip out from beneath the carrier head 80 during polishing operations.

Chemical Mechanical Polishing Process and Composition

Planarizing processes and compositions are provided to selectively remove metal residues and a portion of a barrier layer from a substrate surface being processed. In one aspect, the invention provides a composition adapted for selective removal of a conductive material residue, such as copper residue, and a barrier layer material, such as tantalum, in a polishing process, the composition including a chelating agent, an oxidizer, a corrosion inhibitor, abrasive particles, and water. The composition may further include one or more pH adjusting agents and/or one or more pH buffering agents.

The one or more chelating agents may include one or more amine or amide groups, such as ethylenediaminetetraacetic acid, ethylenediamine or methylformamide. The one or more chelating agents may also include an amino containing acid, a carboxylic acid or a aminocarboxylic acid, such as glycine, and combinations thereof. The one or more chelating agents can be present in an amount of about 2 vol % or less. In one aspect of the invention, the composition comprises between about 0.01 vol % and about 0.5 vol % of the one or more chelating agents. The chelating agent chemically reacts with metal ions removed from the polished surface to form a soluble metal complex to minimize re-deposition of metal ions on the surface of the substrate.

The one or more oxidizers can be any of various conventional oxidizers employed in CMP compositions and processes, such as hydrogen peroxide, ferric nitride, or other compounds such as iodates. The oxidizers can be present in an amount between about 0.01 vol % and about 0.5 vol % of the CMP composition. In one aspect of the invention, the composition comprises between about 0.01 vol % and about 0.2 vol % of the one or more oxidizers.

Examples of corrosion inhibitors include any various organic compounds containing an azole group, such as benzotriazole, mercaptobenzotriazole, or 5-methyl-1-benzotriazole. The composition comprises about 2 vol % or less corrosion inhibitors. In one aspect, the corrosion inhibitors can be present in an amount between about 0.01 vol % and about 0.04 vol % of the CMP composition. The corrosion inhibitors reduce oxidation of oxidizable conductive material, such as copper, and thus, can allow control of the removal rate of the oxidizable conductive material in relation to barrier layer removal rate and oxide removal rate.

The composition may have an abrasive particle concentration of about 35 wt. % or less of the composition. Alternatively, a concentration between about 2 wt. % or less of abrasive particles is included in CMP compositions described herein. One example of a CMP composition having abrasive particles includes a colloidal suspension of silica (silicon oxide) particles, with an average size of about 50 nm. Other abrasive components which may be used in CMP compositions include, but are not limited to, alumina, zirconium oxide, titanium oxide, cerium oxide, or any other abrasives known in the art and used in conventional CMP compositions.

Alternatively, embodiments of the invention may include adding a pH adjusting agent and/or pH buffering agent to the compositions described herein for planarizing a substrate surface. The pH adjusting agent or agents can be present in an amount sufficient to adjust the pH of the CMP composition to a range of about 3 to about 11 and can comprise any of various non-chelating bases, such as potassium hydroxide (KOH) or inorganic and/or organic non-chelating acids, such as phosphoric acid, acetic acid, and oxalic acid. The pH adjusting agent may be present at a concentration up to about 1 vol % of the composition.

The pH buffering agent may be any buffer, such as an alkali metal salt including an alkali metal bicarbonate or tetraborate-tetrahydrate salt. Examples of suitable salts include potassium bicarbonate or potassium tetraborate-tetrahydrate. The pH buffering agent may be present at a concentration up to about 1 vol % of the composition. In one aspect of the invention, the composition is maintained at a pH between about 4 and about 6 by the use of a pH adjusting agent and/or pH buffering agent.

The composition described herein selectively removes copper containing materials, such as copper containing residue, and tantalum containing materials at a removal rate ratio of copper containing material to tantalum containing material between about 0.2:1 and about 2:1. In one aspect of the invention, the removal rate ratio of copper containing material to tantalum containing material between about 0.5:1 and about 1:1.

In one embodiment of the invention described above, the composition adapted for selective removal of a conductive material residue and a barrier layer material may include about 0.1 vol % and about 0.4 vol % of glycine as a chelating agent, between about 0.01 vol % and about 0.2 vol % hydrogen peroxide as the oxidizer, between about 0.01 vol % and about 0.04 vol % benzotriazole as the corrosion inhibitor, between about 0.01 wt. % and about 2 wt. % abrasive particles, water, such as distilled or deionized water, and a pH level between about 4 and about 6. The composition may also include between up to about 1 vol % phosphoric acid as a pH adjusting agent and/or up to about 1 vol % of potassium bicarbonate as a pH buffering agent. One example of a CMP process employs a polishing pressure between about 1 and about 2 psi, and a platen speed of about 20 to 120 rpm for a polishing duration of about 30 seconds to 2,000 seconds in the apparatus described above and shown in FIG. 1.

The CMP compositions and processes described herein can be employed to polish and planarize metal layers, including layers comprised of copper, copper alloys, doped copper, aluminum, doped aluminum, nickel, doped nickel, tungsten, tungsten nitride, titanium, titanium nitride, and combinations thereof. It is further contemplated that other materials, including titanium-tungsten (TiW), titanium silicon nitride (TiSiN), tungsten silicon nitride (WSiN), and silicon nitride used for forming barrier layers with conductive materials, such as copper, may be polished and planarized using aspects of the invention.

Figure 2:
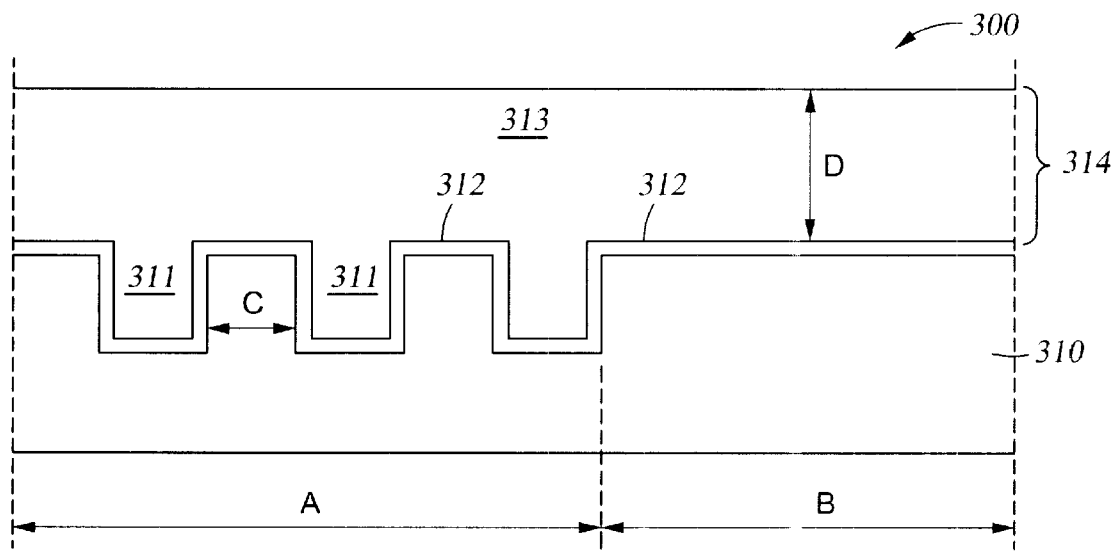
FIGS. 2–4 are schematic diagrams illustrating one embodiment of a process for forming a feature on a substrate.
Figure 3:
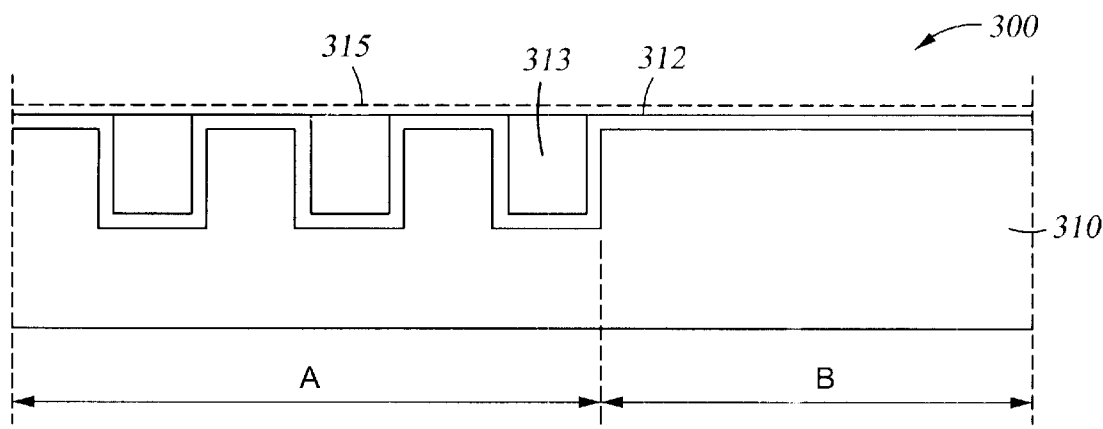
Figure 4:
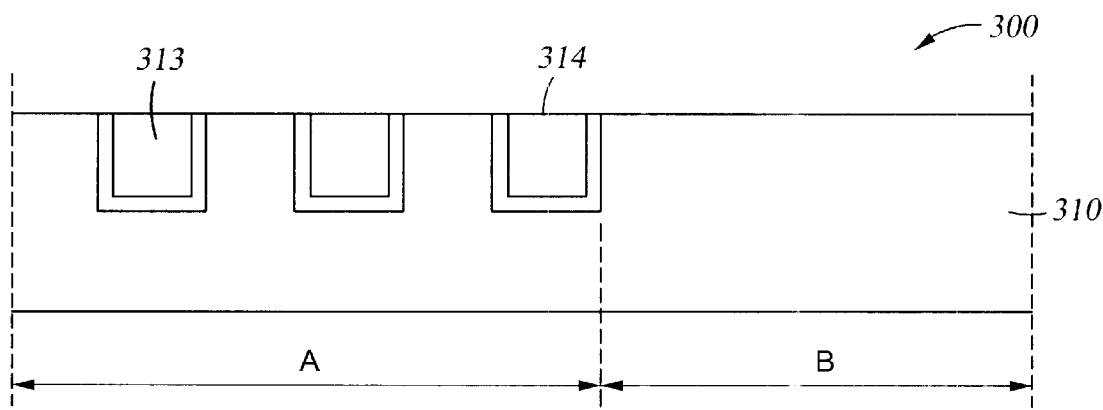

FIGS. 2–4 are a series of schematic cross-sectional views of a substrate illustrating sequential phases of a process for forming a feature on a substrate utilizing the compositions described herein.

Referring to FIG. 2, the substrate includes a dielectric layer 310, such as a silicon oxide or a carbon-doped silicon oxide, formed on a substrate 300. A plurality of openings 311 are then patterned and etched into the dielectric in area A to form features for a dense array of conductive lines with area B remaining unetched. Typically, the openings 311 are spaced apart by a distance C which can be less than about 1 micron, such as about 0.2 micron, or greater than 10 microns, such as 20 microns. The openings 311 are formed in the dielectric layer 310 by conventional photolithographic and etching techniques. A barrier layer 312 of a conductive material, such as tantalum (Ta) or tantalum containing material including tantalum nitride (TaN) for a copper metallization, is deposited conformauly in openings 311 and on the upper surface of the dielectric layer 310. A copper layer 313 is disposed on the barrier layer at a thickness (D) between about 8,000 Å and about 18,000 Å.

Referring to FIG. 3, the substrate is exposed to a CMP process employing a polishing composition to substantially remove the copper layer 313 while selectively removing the copper containing material in comparison to the tantalum-containing, i.e., TaN barrier layer 312. Removing the copper containing material using a bulk removal CMP composition having a selectivity of about 1:0 between copper containing materials and tantalum containing material allows for effective removal of the copper layer 313 to the tantalum containing layer 312, minimizing removal of the TaN layer, minimizing dishing of the copper layer 313, and minimizing formation of a non-planar surface.

Suitable compositions for copper removal are disclosed in co-pending U.S. pat. application Ser. No. 09/543,777, filed on Apr. 5, 2000, U.S. pat. application Ser. No. 09/544,281, filed on Apr. 6, 2000, and U.S. pat. application Ser. No. 09/608,078, filed on Jun. 30, 2000, all of which are incorporated herein by reference to the extent not inconsistent with the invention.

Copper containing materials remaining from the polishing process are present as residue 315 as illustrated by the dashed line. A composition for selective removal of a conductive material residue and a portion of the barrier layer from a substrate surface is then applied to remove the copper residue 315 and, generally, at least a portion of the barrier layer 312. The composition comprises a chelating agent, an oxidizer, a corrosion inhibitor, abrasive particles, and deionized water. The composition may further include a pH adjusting agent and/or a pH buffering agent.

An example of the composition for selective removal of a conductive material residue and a barrier layer material includes between about 0.1 vol % and about 0.4 vol % of glycine as a chelating agent, between about 0.01 vol % and about 0.2 vol % hydrogen peroxide as the oxidizer, between about 0.01 vol % and about 0.04 vol % benzotriazole as the corrosion inhibitor, between about 0.01 wt. % and about 2 wt. % abrasive particles, water, such as distilled or deionized water, and a pH level between about 5 and about 10. The composition may also include up to about 1 vol % of phosphoric acetic acid as a pH adjusting agent and/or up to about 1 vol % percent of potassium bicarbonate as a pH buffering agent. The composition removes the copper containing material, the copper residue and the tantalum containing barrier layer at a removal rate ratio between about 0.5:1 and about 1:1

Referring to FIG. 4, the barrier layer 312 is removed to the dielectric layer 310 and/or removed to reduce scratching or defects formed on the substrate surface, thereby completing planarization. An example of a barrier layer removal process for tantalum containing materials layer is disclosed in co-pending U.S. pat. application Ser. No. 09/569,986, entitled, "Selective Removal Of Tantalum-Containing Barrier Layer During Metal CMP," filed on May 11, 2000, and incorporated herein by reference to the extent not inconsistent with the invention. The resulting copper features comprise a dense array (A) of copper lines 313 bordered by open field B and the planar surface 314 of the copper metallization and substrate 300.

It has been observed that the resulting features formed with the compositions described herein exhibit reduced amounts or an absence of metal residues, such as copper residue, on the surface of the substrate after the CMP process. The CMP composition containing the amine and copper salts also produced an improved polish quality without detrimentally affecting the performance of the CMP composition. The compositions described herein have been advantageously used in removing conductive materials, such as copper, from barrier layers, such as tantalum nitride, deposited on substrate surfaces.

The invention described herein is applicable to planarizing a substrate surface during various stages of semiconductor manufacturing by any of various CMP techniques using any of various CMP systems and polishing articles, such as fixed abrasive or abrasive slurry-type pads or sheets. The invention described herein enjoys particular applicability in the manufacture of high density semiconductor devices with metal features in the deep submicron range.

While the foregoing is directed to the one or more embodiments of the invention, other and further embodiments of the invention may be devised without departing from the basic scope thereof, and the scope thereof is determined by the claims that follow including their equivalents.

What is claimed is:

1. A composition adapted for selective removal of a conductive material residue and a barrier layer material in a polishing process, the composition consisting essentially of:
   between about 0.01 vol % and about 2 vol % of a chelating agent selected from a group of glycine, ethylenediaminetetraacetic acid, ethylenediamine, methylformamide, and combinations thereof;
   an oxidizer;
   between about 0.005 vol % and about 0.2 vol % of a corrosion inhibitor;
   about 35 wt. % or less of abrasive particles selected from the group of silica, alumina, titanium oxide, zirconium oxide, cerium oxide, and combinations thereof; and
   water.

2. The composition of claim 1, wherein the oxidizer comprises between about 0.01 vol % and about 0.5 vol % of the composition.

3. The composition of claim 1, further comprising a pH adjusting agent.

4. The composition of claim 3, wherein the pH adjusting agent comprises up to about 1 vol % of the composition.

5. The composition of claim 1, wherein the composition has a pH of about 3 to about 11.

6. The composition of claim 1, further comprising a pH buffering agent.

7. The composition of claim 6, wherein the pH buffering agent comprises up to about 1 vol % of the composition.

8. The composition of claim 1, wherein the pH buffering agent comprises an alkali metal salt selected from the group of alkali metal bicarbonate, tetraborate-tetrahydrate salt, potassium bicarbonate, potassium tetraborate-tetrahydrate, and combinations thereof.

9. The composition of claim 1, wherein the abrasive particles comprise about 2 wt. % or less of the composition.

10. The composition of claim 1, wherein the pH adjusting agent is a non-chelating acid or base selected from the group of potassium hydroxide, phosphoric acid, acetic acid, oxalic acid, or combinations thereof.

11. The composition of claim 1, wherein conductive material residue and a barrier layer material are removed at a conductive material residue to barrier layer material removal rate ratio between about 0.2:1 and about 2:1.

12. The composition of claim 11, wherein the conductive material residue comprises copper, copper alloys, doped copper and combinations thereof, and the barrier layer materials comprises a tantalum containing material.

13. The composition of claim 1, wherein the composition comprises:
    between about 0.1 vol % and about 0.4 vol % glycine;
    between about 0.01 vol % and about 0.5 vol % hydrogen peroxide;
    between about 0.01 vol % and about 0.04 vol % benzotriazole;
    about 2 wt. % or less silica abrasive particles;
    a pH between about 4 and about 6; and
    water.

14. A composition adapted for selective removal of a conductive material residue and a barrier layer material in a polishing process, the composition comprising:
    a chelating agent selected from a group of compounds having one or more amine or amide groups, an amino containing acid, or an aminocarboxylic acid, and combinations thereof;
    an oxidizer;
    a corrosion inhibitor;
    abrasive particles;
    a pH adjusting agent for providing a pH between about 3 to about 11;
    a pH buffering agent; and
    water.

15. A method for selective removal of a conductive material residue and a portion of the barrier layer from a substrate surface, the method comprising:
    applying a composition to a polishing pad to selectively remove copper containing materials and tantalum containing materials at a removal rate ratio of copper containing material to tantalum containing material between about 0.2:1 and about 2:1, the composition comprising:
        a chelating agent selected from a group of compounds having one or more amine or amide groups, an amino containing acid, or an aminocarboxylic acid, and combinations thereof;
        an oxidizer;
        a corrosion inhibitor;
        abrasive particles; and
        water.

16. The method of claim 15, wherein the chelating agent is selected from the group of glycine, ethylenediaminetetraacetic acid, ethylenediamine, methylformamide, and combinations thereof.

17. The method of claim 15, wherein the chelating agent comprises between about 0.01 vol % and about 2 vol % of the composition.

18. The method of claim 15, wherein the oxidizer comprises between about 0.01 vol % and about 0.5 vol % of the composition.

19. The method of claim 15, wherein the corrosion inhibitor comprises between about 0.005 vol % and about 0.2 vol % of the composition.

20. The method of claim 15, further comprising a pH adjusting agent.

21. The method of claim 20, wherein the pH adjusting agent comprises a non-chelating acid or base selected from the group of potassium hydroxide, phosphoric acid, acetic acid, oxalic acid, or combinations thereof and comprises up to about 1 vol % of the composition.

22. The method of claim 15, wherein the composition has a pH of about 3 to about 11.

23. The method of claim 15, further comprising a pH buffering agent.

24. The method of claim 23, wherein the pH buffering agent comprises an alkali metal salt selected from the group of alkali metal bicarbonate, tetraborate-tetrahydrate salt, potassium bicarbonate, potassium tetraborate-tetrahydrate, and combinations thereof and comprises up to about 1 vol % of the composition.

25. The method of claim 15, wherein the abrasive particles comprise about 35 wt. % or less of the composition.

26. The method of claim 25, wherein the abrasive particles comprise about 2 wt. % or less of the composition.

27. The method of claim 25, wherein the abrasive particles comprise materials selected from the group of silica, alumina, titanium oxide, zirconium oxide, cerium oxide, and combinations thereof.

28. The method of claim 15, wherein conductive material residue and a barrier layer material are removed at a conductive material residue to barrier layer material removal rate ratio between about 0.2:1 and about 2:1.

29. The method of claim 15, wherein the conductive material residue comprises copper, copper alloys, doped copper and combinations thereof, and the barrier layer materials comprises a tantalum containing material.

30. The method of claim 15, wherein the composition comprises:
    between about 0.1 vol % and about 0.4 vol % glycine;
    between about 0.01 vol % and about 0.5 vol % hydrogen peroxide;
    between about 0.01 vol % and about 0.04 vol % benzotriazole;
    about 2 wt. % or less silica abrasive particles;
    a pH between about 4 and about 6; and
    water.

31. A method for processing a substrate, comprising:
    providing a substrate comprising a dielectric layer with feature definitions formed therein, a barrier layer conformally deposited on the dielectric layer and in the feature definitions formed therein, and a copper containing material deposited on the barrier layer and filling the feature definitions formed therein;
    polishing the substrate to substantially remove the conductive material; and
    polishing the substrate with a composition comprising a chelating agent selected from a group of compounds having one or more amine or amide groups, an amino containing acid, or an aminocarboxylic acid, and combinations thereof, an oxidizer, a corrosion inhibitor, abrasive particles, and water to selectively remove copper containing materials and tantalum containing materials at a removal rate ratio of copper containing material to tantalum containing material between about 0.2:1 and about 2:1.

32. The method of claim 31, further comprising polishing the substrate to remove the barrier layer and stopping on the dielectric layer.

33. The method of claim 31, wherein the chelating agent is selected from the group of glycine, ethylenediaminetetraacetic acid, ethylenediamine, methylformamide, and combinations thereof.

34. The method of claim 31, wherein the chelating agent comprises between about 0.01 vol % and about 2 vol % of the composition.

35. The method of claim 31, wherein the oxidizer comprises between about 0.01 vol % and about 0.5 vol % of the composition.

36. The method of claims 31, wherein the corrosion inhibitor comprises between about 0.005 vol % and about 0.2 vol % of the composition.

37. The method of claim 31, further comprising a pH adjusting agent.

38. The method of claim 37, wherein the pH adjusting agent comprises a non-chelating acid or base selected from the group of potassium hydroxide, phosphoric acid, acetic acid, oxalic acid, or combinations thereof and comprises up to about 1 vol % of the composition.

39. The method of claim 31, wherein the composition has a pH of about 3 to about 11.

40. The method of claim 31, further comprising a pH buffering agent.

41. The method of claim 40, wherein the pH buffering agent comprises an alkali metal salt selected from the group of alkali metal bicarbonate, tetraborate-tetrahydrate salt, potassium bicarbonate, potassium tetraborate-tetrahydrate, and combinations thereof and comprises up to about 1 vol % of the composition.

42. The method of claim 31, wherein the abrasive particles comprise about 35 wt. % or less of the composition.

43. The method of claim 42, wherein the abrasive particles comprise about 2 wt. % or less of the composition.

44. The method of claim 42, wherein the abrasive particles comprise materials selected from the group of silica, alumina, titanium oxide, zirconium oxide, cerium oxide, and combinations thereof.

45. The method of claim 31, wherein conductive material residue and a barrier layer material are removed at a conductive material residue to barrier layer material removal rate ration between about 0.2:1 and about 2:1.

46. The method of claims 31, wherein the conductive material residue comprises copper, copper alloys, doped copper and combinations thereof, and the barrier layer materials comprises a tantalum containing material.

47. The method of claim 31, wherein the composition comprises between about 0.1 vol % and about 0.4 vol % glycine, between about 0.01 vol % and about 0.5 vol % hydrogen peroxide, between about 0.01 vol % and about 0.04 vol % benzotriazole, about 2 wt. % or less silica abrasive particles, a pH between about 4 and about 6, and water.

48. The composition of claim 1, wherein the conductive material comprises copper, copper alloys, or doped copper.

49. The composition of claim 1, wherein the barrier layer comprises tantalum or tantalum nitride.

50. The method of claim 15, wherein the conductive material comprises copper, copper alloys, or doped copper.

51. The method of claim 15, wherein the barrier layer comprises tantalum or tantalum nitride.

52. The method of claim 31, wherein the conductive material comprises copper, copper alloys, or doped copper.

53. The method of claim 31, wherein the barrier layer comprises tantalum or tantalum nitride.

54. The composition of claim 14, wherein the composition comprises:
  between about 0.01 vol % and about 2 vol % of a chelating agent selected from a group of glycine, ethylenediaminetetraacetic acid, ethylenediamine, methylformamide, and combinations thereof;
  between about 0.01 vol % and about 0.5 vol % of an oxidizer;
  between about 0.005 vol % and about 0.2 vol % of a corrosion inhibitor;
  about 35 wt. % or less of abrasive particles selected from the group of silica, alumina, titanium oxide, zirconium oxide, cerium oxide, and combinations thereof;
  up to about 1 vol % of a pH adjusting agent, wherein the pH adjusting agent comprises a non-chelating acid or base selected from the group of potassium hydroxide, phosphoric acid, acetic acid, oxalic acid, or combinations thereof;
  up to about 1 vol % of a pH buffering agent, wherein the pH buffering agent comprises an alkali metal salt selected from the group of alkali metal bicarbonate, tetraborate-tetrahydrate salt, potassium bicarbonate, potassium tetraborate-tetrahydrate, and combinations thereof;
  water; and
  a pH between about 4 to about 6.

55. The method of claim 30, further comprising up to about 1 vol % of phosphoric acid, up to about 1 vol % of potassium bicarbonate, or combinations thereof.

56. The method of claim 47, further comprising up to about 1 vol % of phosphoric acid, up to about 1 vol % of potassium bicarbonate, or combinations thereof.

* * * * *